United States Patent Office 3,338,844
Patented Aug. 29, 1967

3,338,844
PROCESS FOR MAKING ARYLENE-CONTAINING POLYMERS
Glyn I. Harris and Hedley S. B. Marshall, Dinas Powis, Glamorgan, Wales, assignors to Midland Silicones Limited, Reading, Berkshire, England
No Drawing. Filed Feb. 18, 1965, Ser. No. 433,780
Claims priority, application Great Britain, Feb. 21, 1964, 7,432/64
5 Claims. (Cl. 260—2)

This invention relates to the preparation of polymer compositions. More specifically the invention relates to the preparation of compositions containing linear or cross-linked polymers derived from compounds containing one or more aromatic nuclei.

According to this invention there is provided a process for the preparation of polymers or mixtures of polymers, the process comprising reacting (1) a compound containing at least one aromatic nucleus with (2) a compound other than (1) and having the general formula

where $x$ has a value of 2 or 3, R is a lower alkyl radical and R' is a divalent or trivalent aromatic radical composed mainly of carbon and hydrogen.

The invention further includes polymers and mixtures of polymers when prepared by the process and also includes a process for the further polymerization or cross-linking of the polymers.

As the compounds (1) containing an aromatic nucleus one can employ aromatic hydrocarbons such as diphenyl, naphthalene, anthracene and terphenyl, and aromatic compounds in which there are present other elements in addition to carbon and hydrogen, for example hydrocarbon ethers such as diphenyl ether, and dibenzyl ether, aromatic amines such as diphenylamine and aromatic sulphides. Also suitable as compounds containing aromatic nucleus are organosilicon compounds in which the aromatic component can be present as a substituent, for example a phenyl radical, attached to one or more of the silicon atoms in an organopolysiloxane. Alternatively the aromatic nucleus can form part of the main chain of an organosilicon polymer in which at least some of the polymer units are silarylene units. If desired the organosilicon compound can be a monomer. Examples of suitable organosilicon compounds include therefore diphenylpolysiloxanes, phenylmethylpolysiloxanes, copolymers containing dimethylsiloxane units and dephenylsiloxane units, cyclic siloxanes containing silicon-bonded aromatic nuclei and silarylene-siloxanes. Mixtures of compounds containing aromatic nuclei can be employed as component (1) in the reaction if desired.

The aromatic compounds are preferably unsubstituted but some substitution is allowable provided the nature of the substituent groups is such that they do not deactivate the hydrogen atoms in the aromatic nucleus, that is, they should not be strongly electron-withdrawing.

The compounds (2) which are employed as reactants in the process of this invention are those having the general formula $R'[-(CH_2OR)]_x$ where $x$ has a value of 2 or 3, and R is a lower alkyl radical, for example a methyl, ethyl or propyl radical. In the general formula R' can be any divalent or trivalent aromatic radical composed mainly of carbon and hydrogen atoms. Preferably R' is a divalent or trivalent hydrocarbon or hydrocarbon oxide radical, for example the phenylene radical

the diphenylene radical,

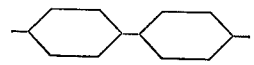

diphenylene oxide

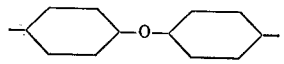

or the radical

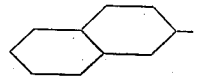

Particularly preferred are the p-xylyleneglycol dialkyl ethers wherein R' represents the phenylene radical and $x=2$.

Reaction between the components (1) and (2) can be brought about by heating them together at temperatures of up to 180° C. or more. In order to achieve reasonably short reaction times the process is best carried out in the presence of a catalyst. Suitable catalysts for the reaction are the mild Friedel-Crafts type catalysts such as stannic chloride, ferric chloride and zinc chloride. The quantity of catalyst employed can be varied between wide limits although it has been found unnecessary to employ more than about 5 percent by weight based on the weight of the reactants. For most cases the presence of 1% by weight or less of the catalyst will prove sufficient.

Solvents, for example the halogenated hydrocarbons such as dichlorobenzene and dichloroethane can be added to the reaction mixture in order to compatibilize the reactants or to assist in the recovery of the reaction product.

The nature of the reaction product will to some extent be determined by the relative proportions of the essential components of the reaction mixture. For example when the compounds diphenyl ether and a xylyleneglycol ether are reacted in substantially equal molar proportions the final product will comprise a large proportion of a substantially linear polymer in which the repeating unit has the formula

However, on increasing the proportion of the p-xylyleneglycol ether a product will be obtained which is more highly cross-linked. Preferably the reaction mixture contains from about 50–70 mol percent of the glycol ether (2) and from about 50–30 mol percent of the aromatic compound (1).

If desired the reaction can be allowed to proceed to completion in one stage, that is, the compound containing an aromatic nucleus can be converted directly to a highly polymerized or cross-linked state by reaction with the glycol ether. In practice however, and in common with the techniques commonly employed in the manufacture of organic or silicone resins, the reaction between the ingredients (1) and (2) is preferably stopped at a chosen intermediate point and at a time when the mixture is still capable of further reaction to achieve further cross-linking and hardening. Thus the reaction can be terminated at a stage when the reaction product is still a relatively low molecular weight polymer, and is suitable for use for example as a coating or laminating resin. Preferably, therefore, the process of this invention is carried out in two stages whereby the first stage comprises forming a partially cross-linked, or partially polymerized, product which can then be stored if desired. The second stage comprising further polymerizing or cross-linking the composition to produce a resin having the desired properties.

The polymers obtained by the process of this invention can vary from pourable, low polymeric materials to hard brittle resins. As hereinbefore mentioned they preferably comprise the relatively low molecular polymers which are capable of further polymerization and/or cross-linking. In this condition they lend themselves to a variety of applications, for example as coating, insulating or laminating resins. Hardening of the resins by further polymerization and/or cross-linking can be achieved by the application of heat and/or pressure if desired For certain applications it may be desirable to add a plasticizer such as a chlorinated wax to the compositions to modify the characteristics of the cured product. Preferably the plasticizer should be resistant to high temperatures in order that this property of the resins of this invention may be fully realized.

The resins of this invention also find application in high-temperature-resistant paints, in the bonding of mica to produce electrical insulation and for impregnating asbestos and other fibres. By incorporating suitable fillers, for example silicas or talc, the polymers of the invention may also be employed in the preparation of moulding and void filling compounds. The polymer compositions of this invention are resistant to attack by organic solvents and solvent vapours. They are therefore useful as protective overcoatings for the more conventional materials.

The following examples illustrate the invention.

Example 1

Octaphenylcyclotetrasiloxane (160 g., 0.2 M) was mixed with p-xylylenglycoldimethylether (69.6 g., 0.4 M) and diluted to an approximately 50% solution with o-dichlorobenzene (200 g.) and 1:2 dichloroethane (40 g.).

The solution was then warmed to 120° C. and maintained at this temperature for 30 minutes with stirring to remove any traces of moisture from the system. After allowing the solution to cool to 60° C., stannic chloride (0.46 ml., 0.004 M) was added and the pot temperature raised again to 160° C. At this stage methanol distilled slowly out of the system and after 6½ hours a very viscous solution was obtained. Samples of this solution set after less than 3 hours heating at 150° C. (without the addition of further catalysts) to give a strong, nontacky resinous film.

Example 2

Diphenylether (102 g., 0.6 M) was mixed with p-xylylene glycoldimethylether (107.96, 0.65 M) and the mixture heated for a short period at 120° C., in order to remove any moisture present. The mixture was then allowed to cool and stannic chloride (0.15 ml., 0.0013 M) was added.

The system was then heated initially at 150–160° C. with stirring for 2½ hours, during which period methanol distilled out of the system and a brown slightly fluorescent viscous product was formed. In order to control the final stages of the polymerization, the system was heated at 80–90° C. under reduced pressure until the molecular weight was sufficiently high to give a viscosity of 98 cs. after diluting the product with xylene to a 60% by weight solution.

Samples of this polymer on heating for 3 hrs. at 135° C. give a hard film.

Example 3

Diphenylamine (152 g., 0.9 M) was mixed with p-xylyleneglycoldimethylyether (183 g., 1.1 M) and the system heated for a few minutes at 120° C. to remove any moisture present. The mixture was then allowed to cool and stannic chloride (2.53 ml., 0.022 M) was added.

The system was heated with stirring for 11 hrs. at 120–130° C. during which time a steady stream of methanol was evolved and a green-coloured polymer formed. The reaction was rapidly stopped at the end of this period by the addition of o-dichlorobenzene to the reaction mixture to give a solution containing 54.5% by weight resin solids and having a viscosity of 106 cs. at 25° C.

Example 4

Diphenyl (1310 g., 8.5 mole) was mixed with p-xylyleneglycol dimethylether (1420 g., 8.5 mole), the system heated and then cooled as in Example 3 to drive off any moisture, prior to the addition of stannic chloride (1.9 ml., 0.0165 M).

The reactants were heated with stirring and methanol removed from the reaction mixture. The condensation reaction was allowed to continue until the polymer was very viscous. It was then diluted with chlorobenzene to terminate the reaction. This solvent was subsequently removed by stripping under reduced pressure and replaced with toluene, to give a 50% solution which had a viscosity of 82 cs. at 25° C.

The polymer was found to cure within 3 hrs. at 200° C. to give a very strong glossy film having good resistance to organic solvents. The resin was also found to be suitable for the preparation of glasscloth laminates.

Example 5

Diphenyloxide (17.02 g., 0.1 mole) was mixed with p-xylyleneglycoldibutylether (25.03 g., 0.1 mole), the system heated and cooled, then stannic chloride (0.023 ml., 0.0002 M) added.

The reaction mixture was heated and stirred to condense the two reactants and liberate n-butanol. The reaction was allowed to continue until a viscous polymer was obtained. Chlorobenzene was then added to terminate the reaction.

The polymer obtained was similar in properties to that produced according to Example 2.

Example 6

Diphenyloxide (722.56, 4.25 mole) was mixed with p-xylyleneglycoldimethylether (705.5 g., 4.25 mole) warmed, cooled, then $SnCl_4$ (0.9 ml., 0.0078 M) added.

The system was heated and the methanol formed during the condensation reaction removed. Finally, chlorobenzene was added to the viscous polymer and this solvent was later replaced with toluene.

This resin was found to be suitable for use as a vehicle in nonmetallic paints and a paint composition was prepared by mixing 54.8 parts of the resin solution (55% solid), 24.2 parts of titanium dioxide, and 21 parts of xylene. The paint hardened on storing for 1 hr. at 200° C. after being employed to coat mild steel panels. The film in addition to being stable in the temperature range 150–200° C. has excellent solvent resistance.

Example 7

When 10 m.p.c. triphenylphosphate, 40 m.p.c. diphenyl oxide and 50 m.p.c. (mol percent) p-xylyleneglycol dimethylether were reacted according to the method of the previous examples a resinous composition was obtained which could be cured to a flexible film after being applied as a coating on glasscloth.

That which is claimed is:

1. A process for preparing polymers comprising admixing (1) at least one compound containing at least one aromatic nucleus per molecule selected from the group consisting of aromatic hydrocarbons, aromatic ethers, aromatic amines, aromatic sulfides, aromatic phosphates, aryl substituted silanes, aryl substituted siloxanes, silarylenes, and silarylene-siloxane copolymers and (2) at least one compound other than (1) having the general formula $R_1(CH_2OR)_x$ where R' is a divalent or trivalent aromatic radical, R is a lower alkyl radical and $x$ is 2 or 3, and heating the mixture to a temperature in the range from 25° to 180° C. in the presence of a Friedel-Crafts type catalyst.

2. The process of claim 1 further characterized in that the compound containing at least one aromatic nucleus (1) is selected from the group consisting of diphenylether, dibenzyl ether, diphenylamine, diphenylpolysiloxane, phenylmethylpolysiloxanes, biphenyl, diphenyloxide, triphenylphosphate and phenylsilanes.

3. The process of claim 1 further characterized in that the compound (1) is an arylsilane.

4. The process of claim 1 further characterized in that the compound (1) is an arylsiloxane.

5. The process of claim 1 further characterized in that the compound (2) is a p-xylyleneglycoldialkylether.

References Cited
UNITED STATES PATENTS 2,722,555  11/1955  Amidon _____ 260—611

DONALD E. CZAJA, *Primary Examiner.*

LEON J. BERCOVITZ, *Examiner.*

M. I. MARQUIS, *Assistant Examiner.*